US008078692B2

(12) United States Patent
Benguigui

(10) Patent No.: US 8,078,692 B2
(45) Date of Patent: Dec. 13, 2011

(54) METHOD OF LOADING FILES FROM A CLIENT TO A TARGET SERVER AND DEVICE FOR IMPLEMENTING THE METHOD

(75) Inventor: Laurent Benguigui, Paris (FR)

(73) Assignee: Sagem Defense Securite, Paris (FR)

( * ) Notice: Subject to any disclaimer, the term of this patent is extended or adjusted under 35 U.S.C. 154(b) by 693 days.

(21) Appl. No.: 11/136,731

(22) Filed: May 25, 2005

(65) Prior Publication Data
US 2005/0267860 A1 Dec. 1, 2005

(30) Foreign Application Priority Data
May 28, 2004 (FR) ...................................... 04 05811

(51) Int. Cl.
*G06F 15/16* (2006.01)
(52) U.S. Cl. ........................................ 709/219; 709/229
(58) Field of Classification Search .......... 709/231–232, 709/219, 229; 726/4, 21, 26–30; 713/10, 713/165, 168, 173, 176, 179, 181
See application file for complete search history.

(56) References Cited

U.S. PATENT DOCUMENTS

| 5,444,850 | A | * | 8/1995 | Chang | 709/222 |
|---|---|---|---|---|---|
| 5,633,930 | A | * | 5/1997 | Davis et al. | 705/68 |
| 5,778,389 | A | * | 7/1998 | Pruett et al. | 707/204 |
| 5,944,789 | A | * | 8/1999 | Tzelnic et al. | 709/214 |
| 6,324,581 | B1 | * | 11/2001 | Xu et al. | 709/229 |
| 6,393,569 | B1 | * | 5/2002 | Orenshteyn | 726/4 |
| 6,438,468 | B1 | * | 8/2002 | Muxlow et al. | 701/3 |
| 6,785,712 | B1 | * | 8/2004 | Hogan et al. | 709/206 |
| 6,816,728 | B2 | * | 11/2004 | Igloi et al. | 455/431 |
| 6,959,384 | B1 | * | 10/2005 | Serret-Avila | 713/176 |
| 7,043,453 | B2 | * | 5/2006 | Stefik et al. | 705/52 |
| 7,203,630 | B2 | * | 4/2007 | Kolb et al. | 703/6 |
| 7,260,556 | B2 | * | 8/2007 | Stefik | 705/52 |
| 7,325,246 | B1 | * | 1/2008 | Halasz et al. | 726/2 |
| 7,815,100 | B2 | * | 10/2010 | Adams et al. | 235/375 |

(Continued)

FOREIGN PATENT DOCUMENTS
JP 2004295551 A * 10/2004

OTHER PUBLICATIONS

Wiktionary, Definition of authenticity, http://en.wiktionary.org/wiki/authenticity, Accessed Feb. 13, 2010, 2 pages.*

(Continued)

*Primary Examiner* — Kevin Bates
*Assistant Examiner* — Oleg Survillo
(74) *Attorney, Agent, or Firm* — Stites & Harbison PLLC; Jeffrey A. Haeberlin

(57) ABSTRACT

A method is provided for loading files from a client to at least one target server. The method involves transmitting, from the client to the target server, a set of data obtained from the files to be loaded, at least some of the data of the set being encoded; requesting, from the client, an authenticity check, by the target server, on the data of the set using at least some of the encoded data; and when the authenticity of the data of the set has been checked successfully by the target server, loading the files, according to a predetermined format, from the client to the target server.

14 Claims, 3 Drawing Sheets

U.S. PATENT DOCUMENTS

| | | | |
|---|---|---|---|
| 2002/0111720 A1* | 8/2002 | Holst et al. | 701/3 |
| 2002/0112162 A1* | 8/2002 | Cocotis et al. | 713/176 |
| 2002/0124170 A1* | 9/2002 | Johnson, Jr. | 713/176 |
| 2002/0144010 A1* | 10/2002 | Younis et al. | 709/314 |
| 2002/0184348 A1* | 12/2002 | Rapp et al. | 709/220 |
| 2003/0182404 A1* | 9/2003 | Saint-Etienne et al. | 709/220 |
| 2003/0188156 A1* | 10/2003 | Yasala et al. | 713/156 |
| 2003/0217103 A1* | 11/2003 | Yamamoto et al. | 709/203 |
| 2004/0243831 A1* | 12/2004 | Sako et al. | 713/200 |
| 2005/0021969 A1* | 1/2005 | Williams et al. | 713/176 |
| 2005/0027821 A1* | 2/2005 | Alexander et al. | 709/218 |
| 2005/0273592 A1* | 12/2005 | Pryor et al. | 713/150 |
| 2006/0085859 A1* | 4/2006 | Okamoto et al. | 726/26 |
| 2010/0332839 A1* | 12/2010 | Dare et al. | 713/175 |

OTHER PUBLICATIONS

Secardeo, Knowledge Glossary, http://www.secardeo.com/knowledge/glossary.html, Accessed Feb. 13, 2010, 1 page.*

Zhou et al; CDS: a code distribution scheme for active networks; Computer Communications, Elsevier Science Publishers BV, Amsterdam, NL, vol. 27, No. 3; Feb. 14, 2004; pp. 315-321; XP004488363 ISSN: 0140-3664 *abstract p. 320, left column, lines 1-50*.

ARINC Report 665, pp. 1-45.

ARINC Report 615A, pp. 1-67.

* cited by examiner

METHOD OF LOADING FILES FROM A CLIENT TO A TARGET SERVER AND DEVICE FOR IMPLEMENTING THE METHOD

PRIORITY CLAIM

This application claims the priority date of French application Serial No. 04 05811, filed on May 28, 2004, under the provisions of 35 U.S.C. §119.

BACKGROUND OF THE INVENTION

The present invention relates to the loading (or downloading) of files from a client to a target server. It relates more particularly to the loading of applications to servers on board an air transport means.

Methods of loading files to so-called avionics servers, that is, servers used in the context of operation of an air transport means such as an airplane, are currently known. They are based on protocols specifically created for this usage.

FIG. 1 illustrates a file load mode according to such a method of the prior art. A set of files 1 has to be loaded from a client to an avionics type server 5 among a plurality of servers 5-6 of a group 4. The files 1 are, for example, the set of files needed to install and run a computer application, that is, for example, data files, binary files and associated configuration files.

The files 1 are organized to conform to a predetermined format. This format is typically the one defined in the ARINC 665 standard, as drawn up and published by the AEEC (Airlines Electronic Engineering Committee). This format mainly comprises the files to be loaded themselves, and a header listing the different files to be loaded and including various additional simple information, such as a data integrity check field, in the form of a cyclic redundancy code, or CRC (see section 4.0 of ARINC report 665) and a unique identifier commonly called PN or "Part Number" (see section 2.1 of ARINC report 665).

The set of data 2 obtained after formatting the files 1 is then made available to a client 3, for example by reading, on the client, a computer medium on which the set of data 2 has been stored. The client 3 concerned is, for example, an application, that is, a computer program, running on a machine and dedicated to the loading of data to avionics servers. It is often designated DLCS ("Data Loading and Configuration System"). It is further designed to offer a man-machine interface, enabling in particular a user to control a load.

Then, the DLCS client 3 loads the set of data 2 in the ARINC 665 format to a server 5 chosen from the group of avionics servers 5-6 of the group 4. To do this, a specific communication protocol is used between the client 3 and the server 5: this is the ARINC 615A protocol which is also the subject of a report drawn up and published by the AEEC standardization organization.

According to the ARINC 615A protocol, the DLCS 3 transmits the header of the data set 2 to the server 5 which is the load target. The server 5 then analyzes this header and deduces from it the list of files to be loaded. The files contained in the data set 2 in the ARINC 665 format are then loaded to the server 5 which checks their integrity using the corresponding check field included in the header transmitted previously. In this communication mode, the target, that is, the server 5, is by turns client and server, since it requires the loading of the different files based on the list of files available to it. Similarly, the client can become file server, which precludes the use of light clients. This mode of operation also makes communication clumsy and relatively slow.

Furthermore, the interchanges between the DLCS 3 and the server 5 carried out according to the ARINC 615A communication protocol use TFTP (Trivial File Transfer Protocol) as the transfer protocol (see ARINC report 615A, section 5.3.2). The TFTP is in particular described in the technical specification RFC 1350, published in July 1992 by the IETF (Internet Engineering Task Force). The use of this transfer protocol also contributes to making the interchanges between the DLCS 3 and the server 5 relatively slow.

In addition to the loading of files to avionics servers, in particular for setting up dedicated applications, it may be advantageous to load files to other types of servers, also on board but not specific to the avionics domain, for example standard application servers (Web servers, for example). Such file loads could thus be used to set up new services in air transport.

Now, the use of a loading method used in an avionics context, such as that described above with reference to FIG. 1, would not be satisfactory for a number of reasons in such a context. First of all, the standard servers sold commercially are not suited to the use of avionics protocols, in particular the ARINC 615A protocol. Furthermore, even if these servers were upgraded to support the ARINC 615A communication protocol, the situation would not be ideal since ARINC 615A is designed for small file transfers occurring in an environment that is already more than adequately secure, which is not always the case for non-dedicated applications.

Moreover, there is no standard protocol for loading data outside the avionics-specific context, that is, in what is often called the "open world". In practice, there are multiple communication protocols between two communication entities, and a multitude of different file formats and a large number of transfer and transport protocols (HTTP, FTP, UDP, etc). This makes it very difficult to provide a uniform load solution.

Furthermore, the use of "open world" file formats does not allow compatibility with the loading tools used in the avionics sector, so it would be necessary to have two ranges of loading tools: a first for loading specific applications to avionics servers and a second for loading non-dedicated applications to standard servers.

Moreover, a file load to an onboard server according to an "open world" protocol raises problems of security, since it does not guarantee the authenticity of the files loaded, or the consistency of the files in the case of simultaneous loads to one and the same target.

One object of the present invention is to overcome the abovementioned problems.

Another object of the invention is to enable a fast, secure and authenticated file load to standard servers, where appropriate followed by the installation of an application from the loaded files.

Yet another object of the invention is to preserve a degree of compatibility with the loading tools used in the avionics sector.

SUMMARY OF THE INVENTION

The invention thus proposes a method of loading files from a client to at least one target server, the method comprising the following steps:

transmitting, from the client to the target server, a set of data obtained from said files to be loaded, at least some of the data of said set being encoded;

requesting, from the client, an authenticity check, by the target server, on the data of said set from at least some of said encoded data; and when the authenticity of the data of said set has been checked successfully by the target server, loading said files according to a predetermined format from the client to the target server.

Integrity checks on the data received on the server can furthermore be carried out on receipt of said set of data by the target server.

Advantageously, the files concerned are the set of files needed to install and run an application. In this case, an installation request is also advantageously transmitted by the client to the target server.

At least some of the servers of the group of servers are advantageously servers from the "open world", that is standard, non-dedicated servers, unlike avionics servers. At least some of the servers can be onboard in an air transport means, such as an airplane for example.

The client originating the load may furthermore be suitable for loading files to avionics servers. This ensures a certain degree of compatibility of the loading tools between the two "open" and "avionics" worlds.

With the same object in mind, the files are advantageously loaded according to a format used in the avionics sector, such as ARINC 665.

However, the transfer protocol used for the load is preferably a standard protocol, such as HTTPS, and not a protocol from the avionics sector.

The invention further proposes a device organized to load files to at least one target server, comprising:

means for transmitting to the target server a set of data obtained from said files to be loaded, at least some of the data of said set being encoded;

means for requesting an authenticity check, by the target server, on the data of said set from at least some of said encoded data; and means, when the authenticity of the data of said set has been checked successfully by the target server, for loading said files to the target server according to a predetermined format.

The device concerned is a client machine in its relationship with the target server.

The invention also proposes a computer program product to be installed on a device, comprising instructions for implementing the following steps, on execution of the program by a processing unit of said device:

transmitting, from the client to the target server, a set of data obtained from said files to be loaded, at least some of the data of said set being encoded;

requesting, from the client, an authenticity check, by the target server, on the data of said set from at least some of said encoded data; and when the authenticity of the data of said set has been checked successfully by the target server, loading said files according to a predetermined format from the client to the target server.

DESCRIPTION OF PREFERRED EMBODIMENTS

Figure 1:
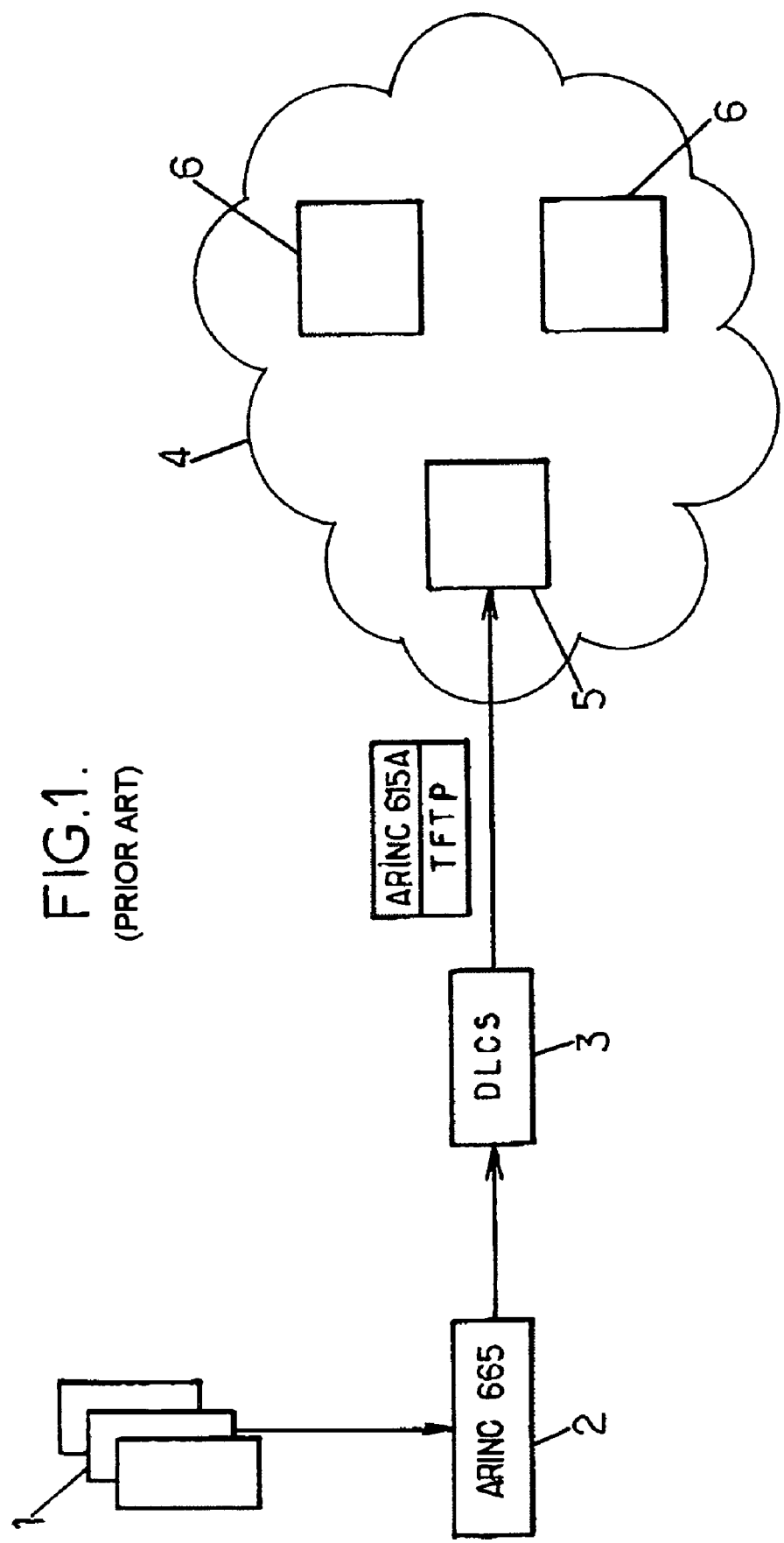
FIG. 1, already discussed, is a diagram illustrating a method of loading files to avionics servers according to a method of the prior art.
Figure 2:
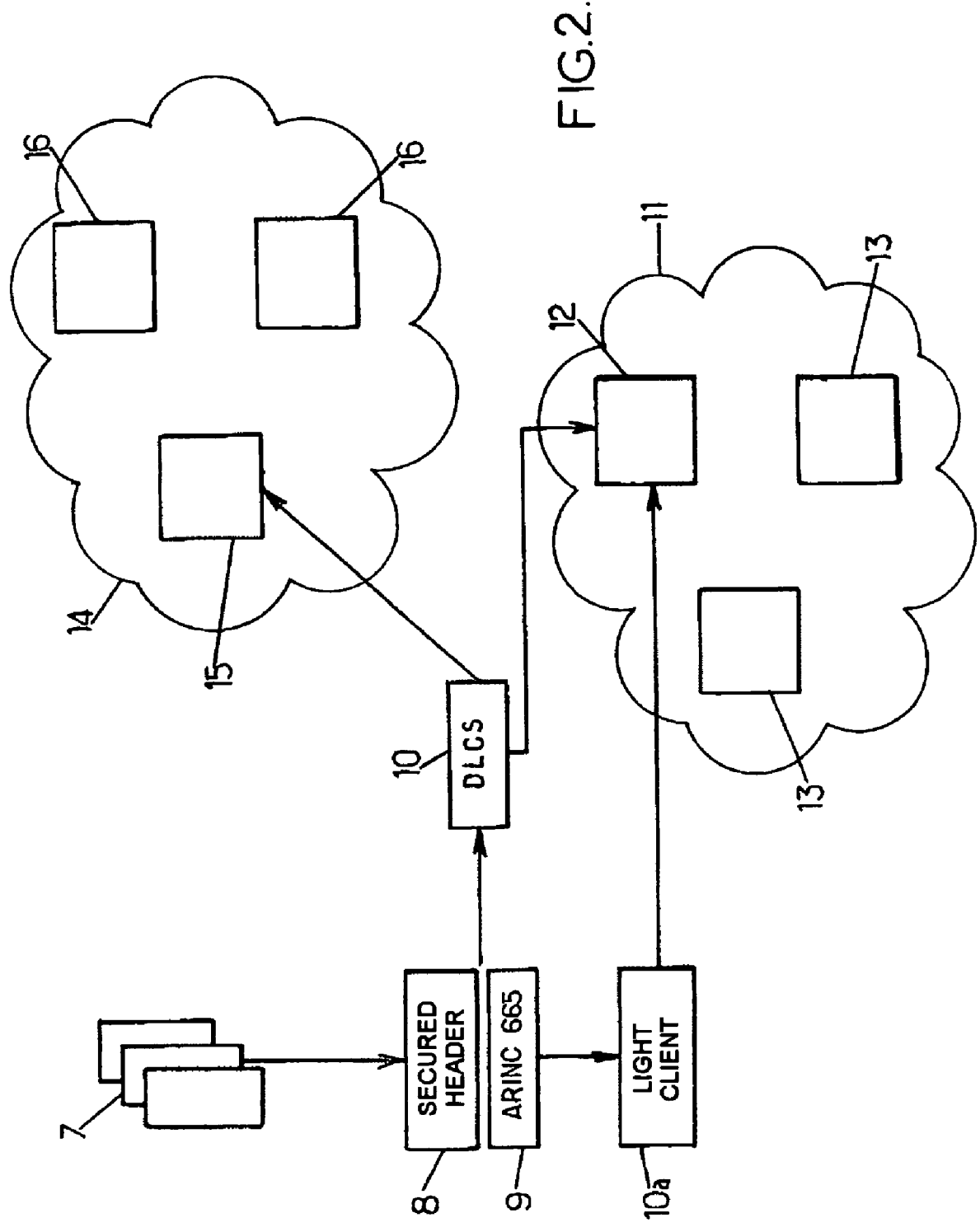
FIG. 2 is a diagram illustrating a method of loading files to "open world" servers according to the invention.

FIG. 2 diagrammatically represents an architecture of a system designed to implement a file load according to the invention. This system comprises in particular a group 11 of "open world" servers 12-13, that is of standard, non-avionics servers, and a group 14 of avionics servers 15-16. It further comprises a client 10 which is based on a DLCS application as described in the introduction, and a light client 10*a* which is not specific to the avionics domain, such as a Web browser for example. The client concerned can be a machine, or even an application, that is a computer program, installed on such a machine.

The description below is concerned with a file load from a client to a target server 12 of the group 11 of standard servers 12-13. The files 7 to be loaded are, for example, the set of files needed to define and install a given application.

According to the invention, a set of data is constructed from files 7 to be loaded to the server 12. This set of data 8 is hereinafter called "secured header". It comprises data relating to the files 7 to be loaded, and encoded data derived from the files to be loaded designed to ensure the authenticity and integrity of the data transmitted.

Figure 4:
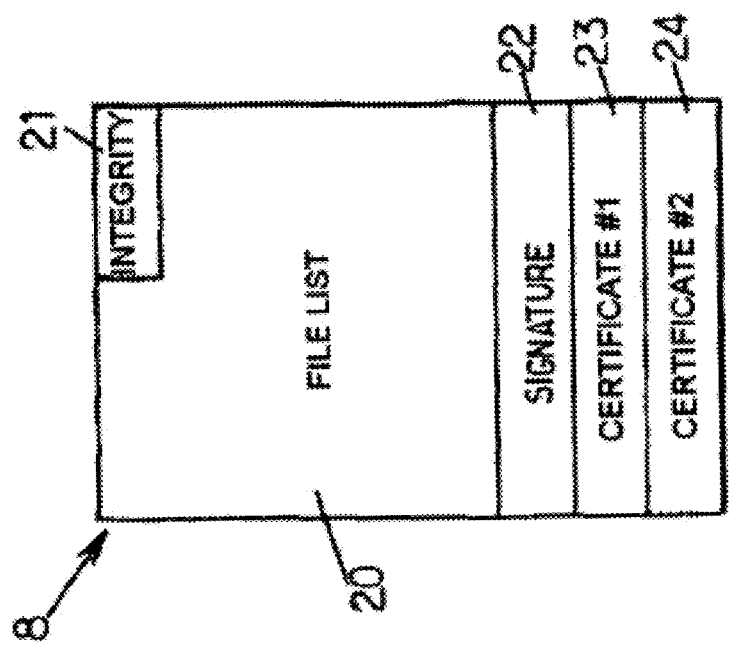
FIG. 4 is a diagram illustrating an advantageous format of a secured header used in the context of a file load according to the invention.

FIG. 4 shows an example of format for such a secured header 8. The latter comprises a list of the files 7 to be loaded in a part 20 of the secured header. It also advantageously comprises at least one field 21 for checking the integrity of the data contained in the secured header, for example in the form of a cyclic redundancy code, or CRC, computed from the list of files present in the part 20 of the header. The integrity check field 21 is used by the recipient of the secured header 8 to check, in a manner known per se, that the data received in this header does indeed conform to that which has been transmitted.

Furthermore, the secured header 8 contains a signature 22 obtained, for example, by hashing the list of files in the part 20 and the check field 21 (hashing is an encoding operation known per se, consisting in computing a binary sequence of restricted size from a larger numeric content). The signature is moreover encrypted using a private key. When the secured header 8 is received by its recipient, the latter can then decrypt the signature 22 using a public key, in a manner known per se. It further carries out the same hashing on the data of the secured header 8 received as that used to generate the signature 22, for the purpose of checking the latter. The authenticity of the secured header 8 is thus checked.

Finally, the secured header 8 of the example illustrated in FIG. 4 can contain a series of certificates 23-24 relating to respective certification authorities. These certificates include the public key used to decrypt the signature 22. FIG. 4 shows two certificates, but it is obviously clear that a single certificate or indeed more than two certificates could be used. The verification of these certificates by the recipient of the secured header 8, in a manner known per se, guarantees the authenticity of the signature 22 and therefore ensures the authenticity of the secured header 8.

Moreover, the data from the files 7 to be loaded is organized to comply with a predetermined format. Advantageously, this format is the same as that used in the avionics sector, that is, ARINC 665 as mentioned in the introduction. The result is a set of data 9 in the ARINC 665 format.

A client, which can be the DLCS client 10 or even the light client 10a, can then perform the loading of the files 7 to the target server 12. For this purpose, it has the secured header 8 and the set of data 9 in the ARINC 665 format mentioned above. The provision of these elements on the client can result, for example, from the reading, by the client, of a computer medium on which these elements have previously been stored. As a variant, it can result from a data transmission. As another variant, the secured header 8 and the set of data 9 in the ARINC 665 format can be generated directly on the client concerned or at least on the machine on which the client is installed.

Figure 3:
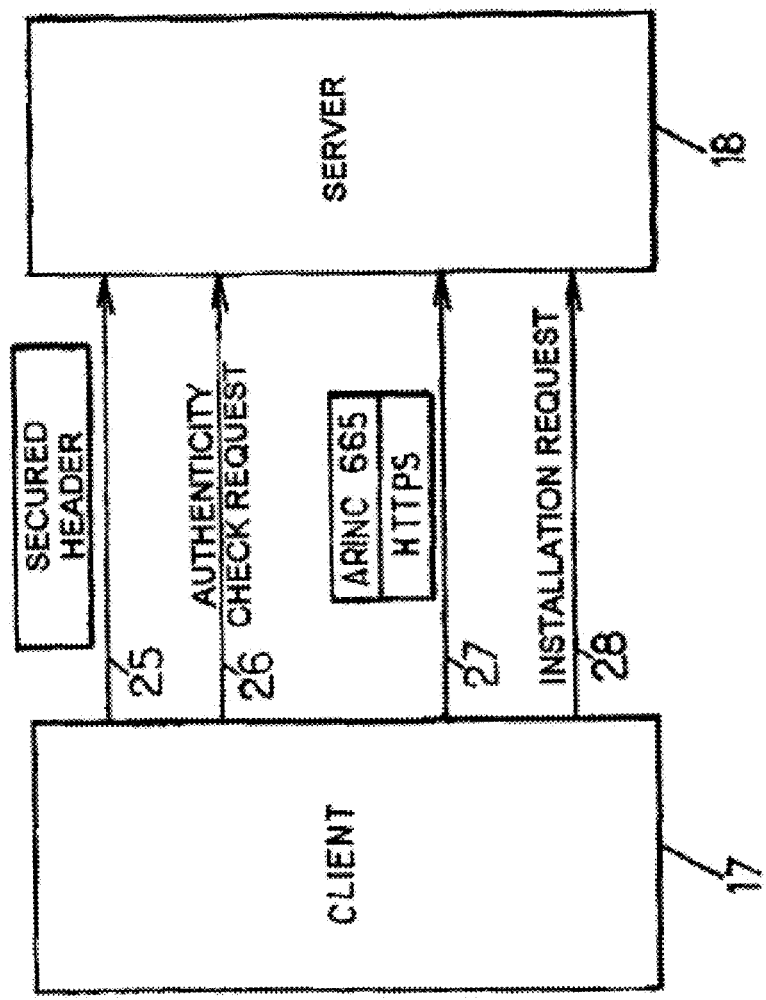
FIG. 3 is a diagram illustrating the main interchanges involved in the context of a file load according to the invention.

A method of loading files 7 from the client to the server according to the invention is described below with reference to FIG. 3. The client 17 of FIG. 3 can, for example, be the client 10 or the client 10a of FIG. 2, while the server 18 of FIG. 3 can, for example, be the server 12 of FIG. 2.

First, the client 17 transmits the secured header 8 to the server 18, this secured header being advantageously in the form described above with reference to FIG. 4 (step 25). The secured header is thus loaded on to the server 18, for example in a temporary directory.

Then, the client 17 sends an authenticity check request to the server 18 (step 26), for the latter to check the certificates included in the secured header 8 previously loaded. On receipt of this request, the server 18 then checks the certificates. If the latter are valid, that is, if they are indeed from authorized certification authorities and are in force, the server then advantageously creates a dedicated directory to receive the files to be loaded. Otherwise, no dedicated directory is created by the server 18, so the load cannot take place. This ensures that the files will be loaded only when the authenticity of the data in the secured header 8 has been checked successfully.

When the check on the authenticity of the data has been completed successfully, the client 17 then transmits the set of data 9 generated from the files to be loaded, said set being in the ARINC 665 format (step 27). The set of data 9 is then loaded to the target server 12, for example in the dedicated directory created in the previous step. This ensures consistency if files are simultaneously loaded to one and the same target server, each of the sets of files loaded being placed in a separate directory, for example based on the corresponding PN. After receipt of this set of data 9, the server 12 then has all the files 7. It can then check that all the files 7 announced in the secured header have indeed been received. It can also check the integrity of the corresponding data.

When the files 7 relate to an application, the client 17 can then transmit to the server 18 an installation request (step 28). On receipt of this request, the server runs an installation script contained in the files previously loaded. Advantageously, the server 18 moves the files 7 received into a final directory before installing the application. The result of the installation is finally returned to the client 17.

At the transfer level, the interchanges between the client 17 and the server 18 are advantageously carried out using the secured hypertext transfer protocol (HTTP), otherwise known as HTTPS, that is, the HTTP protocol designed to support the standardized SSL ("Secure Socket Layer") protocol. The HTTPS transfer protocol is a protocol widely used in the "open world", which ensures interoperability with most software and equipment. It also has the advantage of offering a certain degree of security in the data transfer. In particular, it enables the client 17 originating the load to be authenticated. This protocol is used in particular for each of the transmissions illustrated in FIG. 3. Of course, any other transfer level protocol can be used instead of HTTPS for the transfer of the interchanges between the client 17 and the server 18.

In the data interchange mode described above with reference to FIG. 3, the server 18 is therefore always used as a server, and does not become a client during the file load, which presents an advantage over the load solution used in the avionics sector described in the introduction. This increases the speed and simplicity of the interchanges between client and server according to the invention.

It will be noted that the use of the ARINC 665 file format for loading files to "open world" servers offers the advantage of enabling re-use of the load tools used in the avionics sector. In practice, the client 10 of FIG. 2, for example, is a DLCS which allows a file load to the servers 15-16 of the group 14 of avionics servers. This same DLCS can be used to load the files 7 to a server 12 of the group 11 of standard "open world" servers according to the principles described above. Furthermore, the simplicity of the ARINC 665 protocol enables the servers 12-13 to receive the files loaded according to the invention, without any particular development being needed on these servers, since this format consists mainly of a succession of files to be loaded, with an additional header.

With this arrangement, the same man-machine interface can be used, that is, that of the DLCS client, to load applications to an avionics server and to an "open world" server. It is also possible to use the simple interface of a light client, such as the client 10a of FIG. 2. It is even possible to do without a man-machine interface.

It will thus be understood that the arrangement described with reference to FIGS. 2-4 makes it possible to implement a file load to "open world" servers which is secured, relatively fast and controlled from a client machine. Furthermore, the use of a secured header upstream of the loading of the data in ARINC 665 format ensures the authenticity of the files loaded. Finally, this arrangement provides a high degree of compatibility with the loading tools of the avionics sector.

In another embodiment of the invention, the client 17 does not directly load some of the files, but it transmits, instead, to the server 18, an address at which these files are available, for example an HTTP address. To this end, an HTTP server is available from the target. The server 18, on receipt of the HTTP address, then recovers the files from the specified address.

The invention claimed is:

1. A method of loading files from a client to at least one avionics-type target server on board of an aircraft, the method comprising the following steps:

a.) transmitting, from the client to the avionics-type target server, a set of data obtained from said files to be loaded and comprising a list of said files to be loaded, at least some of the data of said set being encoded and including at least one certificate relating to at least one respective certification authority, said files to be loaded being in a format defined by an avionics standard;

b.) requesting, by the client, an authenticity check to be performed by the avionics-type target server to check that the at least one certificate is from the at least one respective certification authority and is in force; and c.) only after the authenticity of the data of said set has been checked successfully by the avionics-type target server, loading said files in said format using a standard transfer protocol from the client to the avionics-type target server;

wherein the standard transfer protocol is distinct from an avionics-specific communication protocol.

2. The method according to claim 1, further comprising a step for checking, by the avionics-type target server, that all the files to be loaded have indeed been loaded on the avionics-type target server, said checking being performed based on the set of data previously transmitted.

3. The method according to claim 1, further comprising a step for checking, by the avionics-type target server, integrity of said files loaded on the avionics-type target server, said checking being performed based on the set of data previously transmitted.

4. The method according to claim 1, in which, after the authenticity of the data of said set has been checked successfully by the avionics-type target server, a dedicated directory is created, and said files are loaded into said dedicated directory.

5. The method according to claim 1, further comprising a step for transmitting, from the client to the avionics-type target server, a request to install an application associated with said files loaded on the avionics-type target server.

6. The method according to claim 1, in which the avionics standard is the ARINC 665 standard.

7. The method according to claim 1, in which said avionics-specific communication protocol is ARINC 615A.

8. The method according to claim 1, in which the standard transfer protocol is the Secured HyperText Transfer Protocol (HTTPS).

9. A non-transitory computer readable medium comprising a computer program to be installed on a device, the computer program comprising instructions for implementing the following steps upon execution of the program by a processing unit of said device:
   a.) transmitting, from a client to a an avionics-type target server on board of an aircraft, a set of data obtained from files to be loaded and comprising a list of said files to be loaded, at least some of the data of said set being encoded and including at least one certificate relating to at least one respective certification authority, said files to be loaded being in a format defined by an avionics standard;
   b.) requesting, by the client, an authenticity check to be performed by the avionics-type target server to check that the at least one certificate is from the at least one respective certification authority and is in force; and
   c.) only after the authenticity of the data of said set has been checked successfully by the avionics-type target server, loading said files in said format using a standard transfer protocol from the client to the avionics-type target server;
   wherein the standard transfer protocol is distinct from an avionics-specific communication protocol.

10. The non-transitory computer readable medium according to claim 9, further comprising instructions for implementing a step for transmitting, to the avionics-type target server, a request to install an application associated with said files.

11. The non-transitory computer readable medium according to claim 9, wherein the avionics standard is the ARINC 665 standard.

12. The non-transitory computer readable medium according to claim 9, wherein the avionics-specific communication protocol is ARINC 615A.

13. The non-transitory computer readable medium according to claim 9, wherein the standard transfer protocol is the Secured HyperText Transfer Protocol (HTTPS).

14. A method of loading files from a client to at least one avionics-type target server on board of an aircraft, the method comprising the following steps:
   a.) transmitting, from the client to the avionics-type target server, a set of data obtained from said files to be loaded and comprising a list of said files to be loaded, at least some of the data of said set being encoded and including at least one certificate relating to at least one respective certification authority, said files to be loaded being in a format defined by an avionics standard;
   b.) requesting, by the client, an authenticity check to be performed by the avionics-type target server to check that the at least one certificate is from the at least one respective certification authority and is in force;
   c.) only after the authenticity of the data of said set has been checked successfully by the avionics-type target server, an address at which at least one file of said files is available is transmitted from the client to the avionics-type target server;
   and
   d.) loading said files in said format using a standard transfer protocol from the address transmitted to the avionics-type target server;
   wherein the standard transfer protocol is distinct from an avionics-specific communication protocol.

* * * * *